United States Patent [19]

Fredriksen

[11] Patent Number: 5,605,515
[45] Date of Patent: Feb. 25, 1997

[54] CONTROL FOR A POSITIVE DISPLACEMENT MACHINE OF A HYDROSTATIC/MECHANICAL POWER SHIFT GEAR

[75] Inventor: Nils Fredriksen, Harsewinkel, Germany

[73] Assignee: Claas oHG beschrankt haftende offene Handelsgesellschaft, Harsewinkel, Germany

[21] Appl. No.: 528,495

[22] Filed: Sep. 14, 1995

[30] Foreign Application Priority Data

Sep. 20, 1994 [DE] Germany ............... 44 33 488.5

[51] Int. Cl.⁶ ............................................. F16H 61/40
[52] U.S. Cl. ............................................. 475/76; 74/733.1
[58] Field of Search ............................. 475/68, 76, 80; 74/730.1, 733.1; 60/487

[56] References Cited

U.S. PATENT DOCUMENTS 4,776,233 10/1988 Kita et al. ................................. 475/68
4,947,687 8/1990 Martini et al. ........................... 74/733.1
5,193,416 3/1993 Kanayama ............................... 74/733.1
5,207,736 5/1993 Fredriksen ........................ 74/730.1 X
5,552,775 6/1996 Maruyama et al. ....................... 475/76

FOREIGN PATENT DOCUMENTS

3838767C2 6/1989 Germany.
4109884A1 10/1992 Germany.
4339864A1 7/1994 Germany.

Primary Examiner—Khoi Q. Ta
Attorney, Agent, or Firm—Browdy and Neimark

[57] ABSTRACT

A process and device for controlling a hydrostatic positioning mechanism (HG) of a hydrostatic/mechanical, continuous output-distributing power shift gear in which after an engagement of a clutch (K2, K3) of a new gear in a load-free synchronous condition, the positive displacement volume is respectively continuously triggered for a change until the gear branch, which is still running, is released triggering by the clutch (K2, K3) to be disengaged respectively in the disengaging direction and by monitoring a setting signal of a clutch setting sensor (KS2, KS3) of the clutch (K2, K3) to be disengaged until a setting change is signaled.

10 Claims, 3 Drawing Sheets

CONTROL FOR A POSITIVE DISPLACEMENT MACHINE OF A HYDROSTATIC/MECHANICAL POWER SHIFT GEAR

The invention relates to a process for controlling a hydrostatic positioning mechanism of a hydrostatic/mechanical, continuously output-distributing power shift gear, in which a positive displacement volume is altered for a gear change, until a predetermined rpm ratio of a gear engaging shaft rpm to an output shaft rpm is present, after which the engagement of a clutch of a new gear is carried out, and then the positive displacement volume is changed in accordance with a theoretical positive displacement volume, in the direction of a new positive displacement volume, in which the clutch of the respective previously effective gear, which is still running, is released, after which it is disengaged.

This kind of control of a positive displacement machine is known from DE 38 38 767 C2, in which an adjustment of the positive displacement volume according to the theoretical oil requirement, including a defined leakage loss, occurs each time gears are changed, therefore each time the clutch of the previous gear which is to be disengaged can be shifted in as torqueless a manner as possible. The determination of a leakage loss to be taken into consideration based on earlier measurement values and theoretical considerations yields an inexact compromise, since before and after the shift points of successive gear steps, the positive displacement machine operates with a different hydraulic transfer component according to the gear respective sequence, so that the hydraulic pressure ratios and therefore the ratio of the leakage losses is of a different magnitude, which has remained always out of consideration, so that the intended low-torque disengagement of the clutch parts is either not achieved at all or is only achieved during up- or downshifting, which leads to damage of the clutch and the gear and to jerky operation. An improvement is shown in U.S. Pat. No. 5,207,736.

An object of the invention is to provide a control of the positive displacement machine, wherein during each gear change a torqueless setting of the clutch parts to be disengaged is achieved reliably and for a sufficient length of time for complete disengagement.

This object is attained in that during this changing of the positive displacement volume the clutch of the respective, previously effective gear, which is still running, is triggered in the disengaging direction and a clutch setting signal is continuously monitored as to whether disengagement is beginning, and when this is the case, the positive displacement volume achieved is kept constant until a complete disengaging of the relevant clutch is reported by the clutch setting signal.

In known positive displacement machines, the positive displacement volume is provided by a pivoting adjustment of a support, which is carried out in an electrically controlled manner by means of a proportionally functioning hydraulic positioning device. In a smooth, hydrostatic/output distributing gear, the positive displacement machine is used in an additively torque transferring manner before the upshifting of a gear step and in a subtractive manner after the change into the higher gear. In both cases, theoretically synchronous speeds in the clutches to be engaged and disengaged have been preset, so that a smooth engagement of the clutch of the new gear and a smooth disengagement of the clutch of the previous gear as well subsequently takes place. To produce synchronous running at the clutch, in practical operation it is now required that before engaging a new gear, the hydrostatic gear be controlled so that its leakage losses are also covered. Since after the engagement of the new gear leakage losses due to the inverse operation of the hydraulic gear occur again because of the constantly working positive displacement unit, a corrective switch of the positive displacement volume which takes these ratios into account must be carried out to set torqueless operation in the clutch to be disengaged, wherein the different leakage losses must be taken into consideration.

According to the invention, the respective proper corrective setting results independently of the respective pressure ratios and therefore of the corresponding leakage losses, which respectively differs by the shifting ratio, depending on the respectively used distributing ratio in the upper speed range of the lower gear and in the lower speed range of the upper gear. For this reason, the leakage losses are smaller before an upshift in the synchronous state of the clutch to be engaged, than after upshifting during setting to a torqueless operation of the clutch to be disengaged. In a downshift, the loss ratios are reversed. According to the invention, these differences of the leakage losses before and after shifting are taken into consideration in setting the positive displacement volume, so that disengaging is carried out only whenever no torque is transmitted via the clutch parts, which is signalized by the beginning movement of the clutch parts in the respectively proper positive displacement volume setting.

It is advantageously provided that a control loop be used for setting the positive displacement volume, which is supplied with a setting signal of the setting device of the positive displacement volume as the actual positive displacement signal. Furthermore, it is provided that rpm signals are taken off in a known manner at the power supply and power take-off shafts of the hydrostatic gear unit. As a result, by taking into consideration the respective rpm conditions known for the individual gears, it can be achieved that engaging the next desired gear is carried out when there is a synchronicity at the clutch. Now a set position signal, which predetermines the positive displacement regulation, is continually formed in the direction of the theoretical positive displacement setting signal, so that the oil leakage losses, which are different for the new gear branch are increasingly taken into consideration. If after this, the regulating process of the continuous positive displacement setting initiated in this way progresses up to the point that the still running clutch of the gear branch to be disengaged is released, a constant regulation is carried out until this clutch of the earlier gear is completely disengaged, after which the gear will possibly continue to run while the positive displacement volume is predetermined, continuously regulated according to an operational presetting.

This above described regulation and control of the hydraulic system and the clutches also achieves an adaptation of the setting of the hydraulic system during disengagement to the leakage behavior of the device, which changes during continuing operation and which is a function of the temperature of the hydraulic oil and that of the setting unit, and additionally changes with the load.

FIG. 1 shows a diagrammatic view of a multi-gear transmission;

FIG. 2 shows the hydrostatic power components of the transmission;

FIG. 3 shows the hydrostatic pressure conditions in the transmission;

Figure 1:
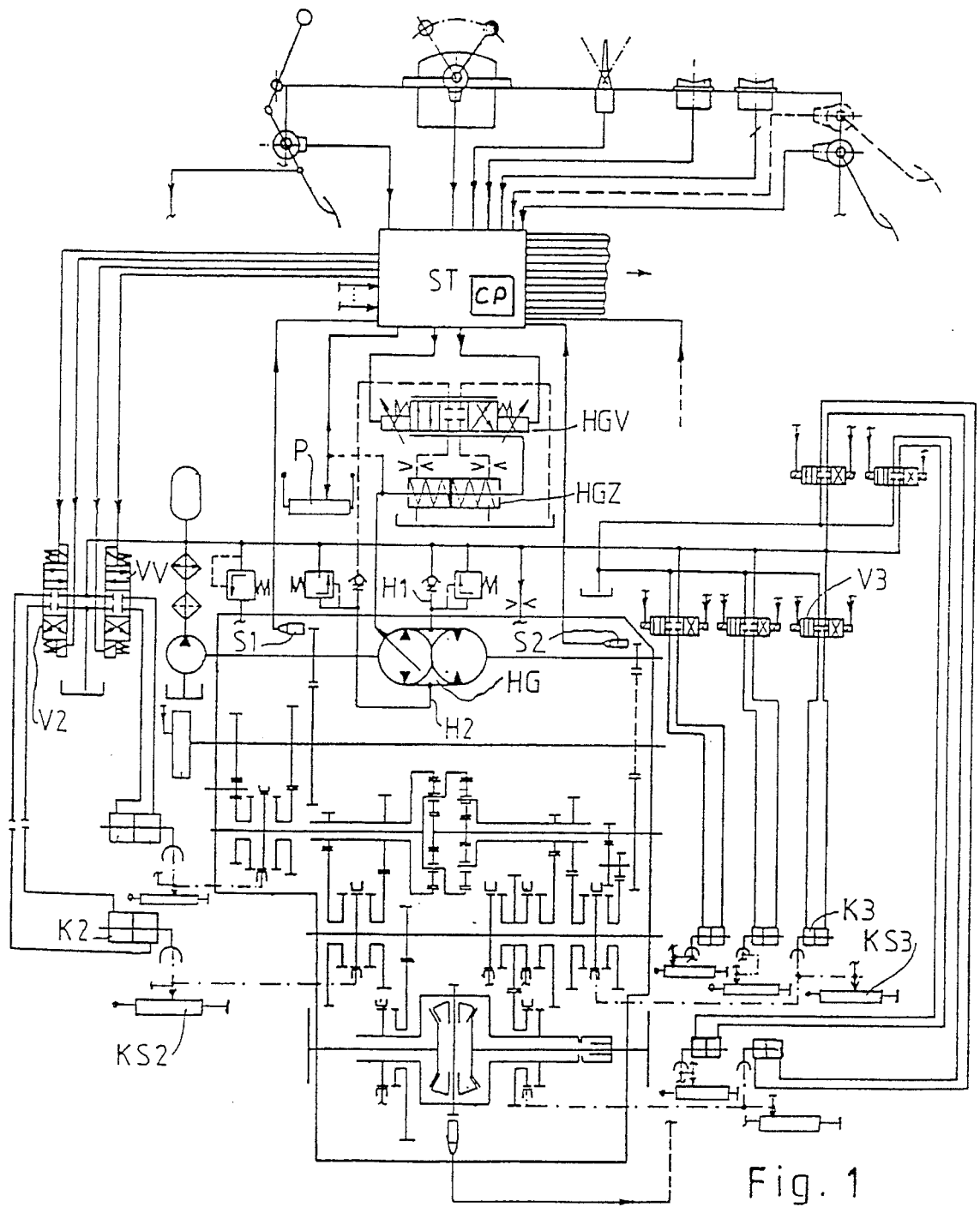
FIGS. 1 to 3 show an advantageous embodiment of a gear with the setting device, which carries out a setting and clutch actuation according to the invention.

FIG. 1 shows a hydrostatic/mechanical output-distributing power shift gear, whose hydrostatic branch is comprised of the hydrostatic positioning mechanism (HG). This is controlled by an electronic control device (ST), which includes a control program (CP), which actuates a hydraulic control cylinder (HGZ) acting in a positioning-proportional manner via an electric/hydraulic control valve pair (HGV), so that this cylinder determines the setting angle and therefore the positive displacement volume of the hydraulic positioning mechanism (HG).

For example, to upshift from second into third gear at a predetermined rpm ratio at the engaging and disengaging shafts of the hydrostatic converter (HG), the availability of this rpm ratio is determined from the signals of the rpm sensors (S1, S2) in the electronic control device (ST), the electro-hydraulic third gear valve (V3), which hydraulically engages the third gear clutch, is actuated by the control device (ST), wherein the detected rpm ratio guarantees that the gear parts of the clutch (K3) of the third gear rotate synchronously before engaging. Then the proportional control valve (HGZ) is acted upon by the control device (ST) via the electro-hydraulic control valve (HGV) in such a way that this proportional control valve (HGZ) is continually correctively adjusted according to the other leakage losses for the torqueless disengaging until no further torque is transferred at the running coupling claws of the second gear clutch (K2). Then the second gear valve (V2) is disengaged by the control device (ST) and as a result the second gear clutch (K2) is hydraulically disengaged in a smooth manner by closing the affiliated controllable valve (V2). The torqueless state at the clutch (K2) is determined in that the signal of the clutch setting sensor (KS2) is continuously monitored by the control device (T) for an occurring position change when the clutch (K2) is acted upon in the direction of disengagement. As soon as a change of the signal has been detected, the further setting of the positive displacement machine is stopped and the complete disengagement of the clutch (K2) is awaited. This takes place by means of continuous monitoring of the clutch setting sensor signal and comparing it to a previously measured and stored setting signal in the disengaged position. In the process it is useful to take into account a tolerance value in regard to the imprecise setting during repeated actuation of the clutch.

To downshift from third gear into second gear, the procedures of the synchronization at the clutch (K2) to be engaged, the engagement of the new gear, the clutch release, and the disengagement of the clutch (K3) of the previous gear are carried out in the reverse order, wherein it should be noted, however, that in downshifting a resetting of the positive displacement volume must be carried out beyond the old positive displacement volume, which prevailed during engagement, after which the disengagement is carried out and only then does the subsequent reduction of the positive displacement volume take place. Corresponding shifting procedures take place in other gear changes.

The difference of the leakages in the two positive displacement units (HG) and the consumers connected to the hydraulic lines (H1, H2) results from the pressure differences before and after the shifting procedures.

Figure 2:
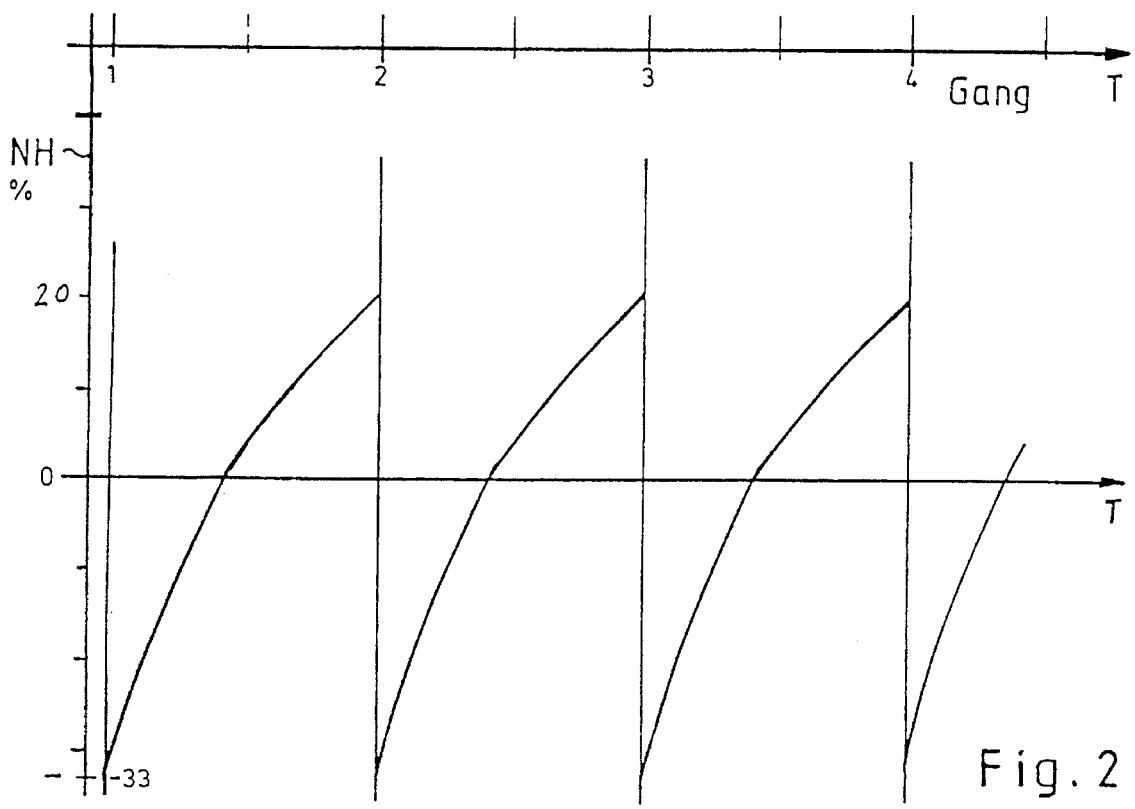

These pressure differences in the hydraulic lines result from the respective hydrostatic power component of the transmitted power in the hydraulic gear branch. This power component (NH) is plotted in FIG. 2 over the transmission ratio (T) for the lower gears of the transmission. Since the setting ratio intended here is 1:1.66, a hydrostatically transferred component of minus 33' or of 20' results, depending upon whether the gear step is operated in the lower or in the upper rpm range.

Figure 3:
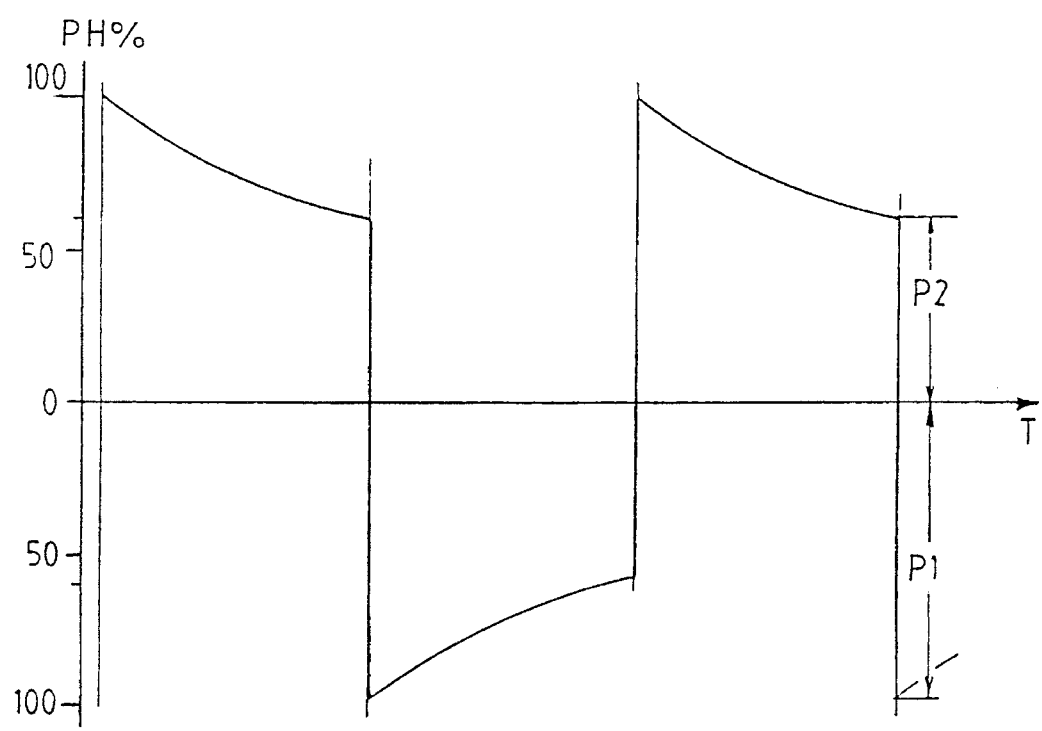

FIG. 3 shows the pressure conditions in the hydrostatic branch. In respect to the amounts, the two pressures (P1, P2) on both sides of the shift point behave toward each other like the setting ratio.

The settings of the proportional setting cylinder (HGZ), see FIG. 1, which are predetermined in respect to the engaging or disengaging times of the clutches (K2, K3) and which take into account the different leakages, are carried out by suitably activating respectively one of the two oppositely acting setting valves of the electro-hydraulic valve unit (HGV) by means of the control device (ST).

For precise adjustability of the proportional valve unit (HGV), the control unit (ST) supplies it with a current which can be preset. This current is preferably fed back to the control device (ST) as an actual positive displacement signal by means of a current sensor.

For precise adjustability, in another embodiment of the device, the amount of adjustment of the proportional setting cylinder (HGZ) is fed back to the control device (ST) as an actual positive displacement signal by means of a position indicator, e.g. a potentiometer (P) on the wiper side.

Figure 4:
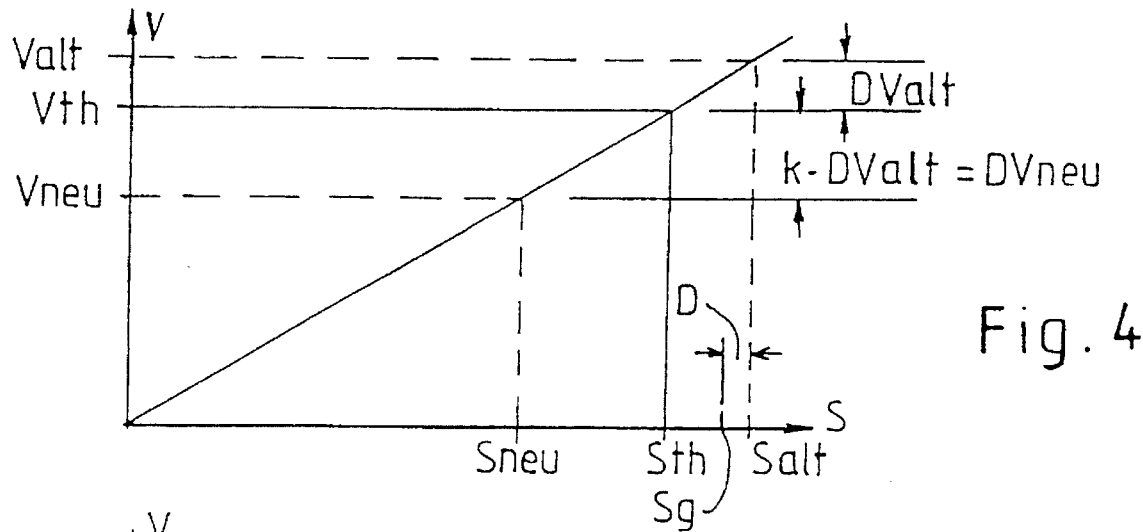
FIG. 4 shows an upshift setting diagram.

FIG. 4 schematically, i.e. enlarged in the shifting range, represents the dependency of the positive displacement volume and the affiliated settings of the control means of the positive displacement volume when upshifting. The old positive displacement volume (Valt) which prevails when engaging, is greater than the theoretical positive displacement volume (Vth) by the leakage volume (DValt). The new positive displacement volume (Vneu), at which the old gear is load-free, is less by a leakage volume difference (DValt× k), which is greater by the leakage volume factor (k), than the theoretical positive displacement volume (Vth). Accordingly, the old and the new settings (Salt, Sneu) are higher or lower by a lesser or a greater amount than the theoretical setting (Sth). Here, the leakage volume factor is greater than 1 in principle, since in the old and in the new state other pressure ratios prevail, which bring about the differences.

Figure 5:
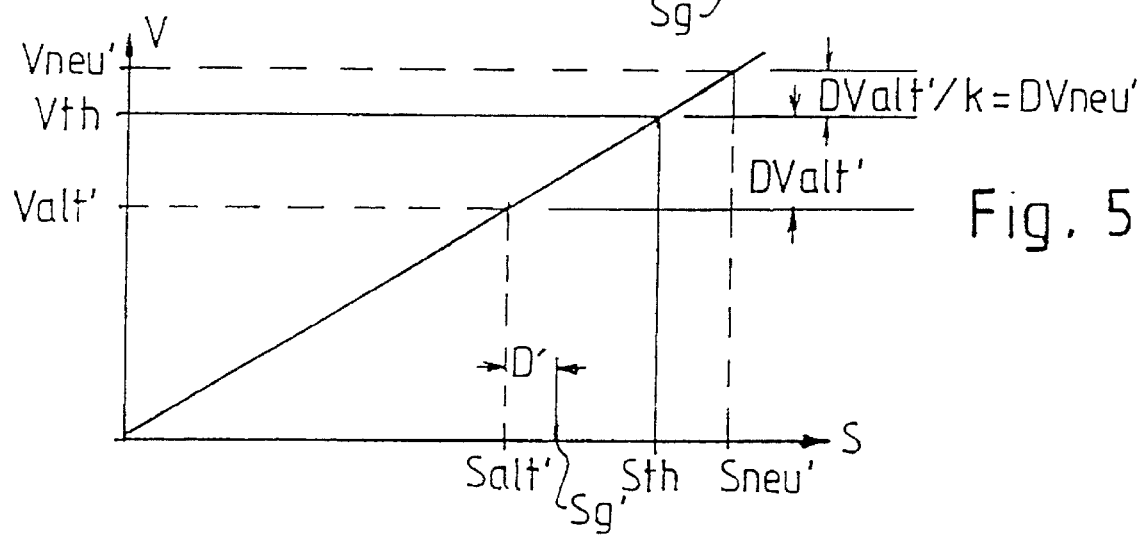
FIG. 5 shows a downshift setting diagram.

FIG. 5, enlarged in the clutch setting range, schematically represents the dependency of the positive displacement volume and the affiliated settings of the positive displacement control means when downshifting. It can be seen that the old positive displacement volume (Valt'), which is triggered when the lower gear is engaged, lies below the theoretical positive displacement volume (Vth) by a larger loss volume (DValt') than the new displacement volume (Vneu') after the downshift, which is required for the load freedom of the old gear, lies above the theoretical volume (Vth). This leakage loss (Dneu') results as the quotient from the old leakage loss (DValt') and the leakage volume factor (k). The representation of the dependency of the positions of the old and the new setting (Salt', Sneu'), when downshifting, on the theoretical setting (Sth) results from the assumed linear interrelationship between the settings of the control means to the volumes.

As can be seen from the depiction, the position (Sneu'), at which smooth disengagement occurs, is further modulated than the clutch engaged position (Salt'). Only after the further modulation is the return of the control toward the opposite setting carried out, if the drive is to be further shifted.

As FIG. 1 shows, all clutches (K2, K3) are equipped with clutch setting sensors (KS2, KS3) so that all shifting procedures can be appropriately carried out. The clutch setting sensors (KS2, KS3) are for example commercially available rotary potentiometers, which are disposed on the actuating shafts of the pivoting claws. The working range of these potentiometers is suitably somewhat greater than the pivot angle of the pivoting claws between the engaged and disengaged state of the connected clutches. Both sensor signal values of the current-supplied potentiometer, which respectively occur in the clutch settings, are stored by the control device and used as comparison values, wherein a tolerance value is suitably taken into account. Storage of the final values can be repeated after each clutching procedure and thus the value can be adapted to possible fluctuations. The setting sensors of the clutches are additionally used to monitor the proper function of the clutch and its setting means, which was also customary up to now. The determination of the proper disengaging conditions by means of the clutch setting sensor signals is a novel, additional use of them.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation.

What is claimed is:

1. A process for controlling a hydrostatic positioning mechanism of a hydrostatic/mechanical, continuously output-distributing power shift gear, comprising the steps of:

altering a positive displacement volume for a gear change, until a predetermined rpm ratio of a gear engaging shaft rpm to an output shaft rpm is present, and then engaging a clutch of a new gear, and then changing a positive displacement volume in accordance with a theoretical positive displacement volume, in the direction of a new positive displacement volume, disengaging and then releasing a clutch of the respective previously effective gear, which is still running;

including triggering, in the disengaging direction during the change of the positive displacement volume, the clutch (K3, K2) of the respective, previously effective gear, which is still running; and continuously monitoring a clutch setting signal as to whether disengagement is beginning, and when disengagement has begun, keeping the positive displacement volume achieved constant until a complete disengagement of the respective clutch (K3, K2) is reported by the clutch setting signal.

2. The process according to claim 1, wherein during the step of altering the positive displacement volume, the clutch (K3) is respectively triggered intermittently for a short time, sufficient for a movement in the disengaging direction, and wherein previous to the step of altering, the process includes the step of storing the clutch setting signal and thereafter comparing the respective clutch setting signal with the stored clutch setting signal and, if the clutch setting signal and the stored clutch setting signal diverge by a predetermined first comparison value, triggering the clutch (K3) to disengage until the respective clutch setting signal has reached a second predetermined comparison value, which signals the complete disengagement of the clutch (K3).

3. The process according to claim 1, including a step of connecting the clutches (K2, K3) to clutch setting sensors (KS2, KS3), and supplying clutch setting signals thereof to an electronic control device (ST).

4. The process according to claim 3, wherein the clutch setting sensors (KS2, KS3) are rotary potentiometers, and including the step of connecting the rotary potentiometers to a clutch setting shaft of the associated clutch (K2, K3) whose angular setting range is respectively greater than a pivoting range of the clutch setting shaft between the engaged and disengaged clutch settings.

5. The process according to claim 4, including a step of respectively storing the clutch setting sensor signals, which are present in the engaged and disengaged clutch settings, in the control device (ST) as the comparison values which, taking into consideration the tolerance values, are used for comparison.

6. The process according to claim 3, including a step of controllably connecting the positioning mechanism (HG) with a proportional valve (HGZ), which is acted upon by an electro-hydraulic control valve assembly (HGV), which is electrically acted upon by the electronic control device (ST), which by means of electro-hydraulic valve (V2, V3) triggers the control valve assembly (HGV) and the clutches (K2, K3).

7. The process according to claim 6, including a step of the control device (ST) acting upon the proportional valve (HGZ) with a respectively predetermined current, proportional to which this is respectively adjusted.

8. The device according to claim 6, including a step of disposing rpm sensors (S1, S2) on the power and power-takeoff shafts of the setting mechanism (HG), the signals of which are monitored by the control device (ST) to respectively ascertain a synchronous state in a clutch (K2, K3) to be engaged.

9. The process according to claim 6, including a step of disposing a setting sensor (P) on one of the proportional valve (HGZ) and on the setting mechanism (HG), the setting signal of which is supplied to the control device (ST), which signal is used as a feedback signal in a control loop for the respective setting of the positive displacement volume.

10. A mechanism for controlling a hydrostatic positioning mechanism of a hydrostatic/mechanical, continuously output-distributing power shift gear, comprising:

means for altering a positive displacement volume for a gear change, until a predetermined rpm ratio of a gear engaging shaft rpm to an output shaft rpm is present;

means for sequentially engaging a clutch of a new gear, changing a positive displacement volume in accordance with a theoretical positive displacement volume in the direction of a new positive displacement volume, and disengaging and then releasing a clutch of the respective previously effective gear, which is still running;

means for including triggering in the disengaging direction, during the change of the positive displacement volume the clutch (K3, K2) of the respective, previously effective gear, which is still running;

means for continuously monitoring a clutch setting signal as to whether disengagement is beginning;

means for keeping, when disengagement has begun, the positive displacement volume achieved constant until a complete disengagement of the respective clutch (K3, K2) is reported by the clutch setting signal.

* * * * *